(12) United States Patent
Levine

(10) Patent No.: US 10,458,880 B2
(45) Date of Patent: Oct. 29, 2019

(54) METHOD AND APPARATUS FOR LEAK DETECTION IN AN IRRIGATION SYSTEM

(71) Applicant: Michael R. Levine, Pinckney, MI (US)

(72) Inventor: Michael R. Levine, Pinckney, MI (US)

( * ) Notice: Subject to any disclaimer, the term of this patent is extended or adjusted under 35 U.S.C. 154(b) by 20 days.

(21) Appl. No.: 16/001,493

(22) Filed: Jun. 6, 2018

(65) Prior Publication Data

US 2018/0348081 A1 Dec. 6, 2018

Related U.S. Application Data

(60) Provisional application No. 62/515,599, filed on Jun. 6, 2017.

(51) Int. Cl.
| | | |
|---|---|---|
| G01M 3/28 | (2006.01) | |
| G01M 3/04 | (2006.01) | |
| G01M 3/26 | (2006.01) | |
| E03B 7/00 | (2006.01) | |

(52) U.S. Cl.
CPC ............ *G01M 3/2815* (2013.01); *G01M 3/04* (2013.01); *E03B 7/003* (2013.01); *G01M 3/26* (2013.01); *G01M 3/2807* (2013.01)

(58) Field of Classification Search
CPC ... E03B 7/003; G01M 3/2807; G01M 3/2815; G01M 3/26
See application file for complete search history.

(56) References Cited

U.S. PATENT DOCUMENTS

| | | | | |
|---|---|---|---|---|
| 4,821,769 A | * | 4/1989 | Mills | .................. F16K 37/0041 |
| | | | | 137/554 |
| 5,048,755 A | * | 9/1991 | Dodds | .................... A01G 25/16 |
| | | | | 137/78.2 |
| 7,383,721 B2 | | 6/2008 | Parsons et al. | |
| 7,458,521 B2 | | 12/2008 | Ivans | |
| 8,130,107 B2 | | 3/2012 | Meyer | |
| 9,504,213 B2 | * | 11/2016 | Levine | .................... A01G 25/16 |
| 10,101,753 B1 | * | 10/2018 | Levine | ................. A01G 25/165 |
| 10,225,997 B1 | * | 3/2019 | Levine | ................. G05B 19/048 |
| 10,306,844 B1 | * | 6/2019 | Levine | ................. A01G 25/165 |
| 2004/0206405 A1 | | 10/2004 | Smith et al. | |
| 2006/0131442 A1 | * | 6/2006 | Ivans | ..................... A01G 25/16 |
| | | | | 239/104 |
| 2007/0029401 A1 | * | 2/2007 | Kaen | ..................... A01C 23/042 |
| | | | | 239/69 |
| 2008/0302172 A1 | * | 12/2008 | Kates | .................. G01M 3/2807 |
| | | | | 73/40.5 R |
| 2016/0165820 A1 | * | 6/2016 | Dean, Jr. | ................ A01G 25/16 |
| | | | | 47/48.5 |

(Continued)

*Primary Examiner* — David A Rogers
(74) *Attorney, Agent, or Firm* — The Concept Law Group; Scott M. Garrett; Scott D. Smiley

(57) ABSTRACT

A sprinkling or irrigation system includes a sprinkler controller that is capable of detecting a leak in one or more zones of the system. The system include a main valve and an adjustable valve in a bypass line around the main valve. The adjustable valve is set to a partially closed state such that a selected on of the zones produces a pressure at a selected proportion of the static pressure provided by the water source such as half the static pressure. A leak is detected when a zone, with the main valve closed and the adjustable valve in the partially closed state, produced a test pressure that is substantially lower than the selected proportion of the static pressure, as modified by a test factor.

23 Claims, 6 Drawing Sheets

(56) References Cited

U.S. PATENT DOCUMENTS

| | | | |
|---|---|---|---|
| 2017/0044744 A1* | 2/2017 | Everhart | E03B 7/003 |
| 2017/0292893 A1* | 10/2017 | Bunker | G01M 3/26 |
| 2018/0042188 A1* | 2/2018 | Khabbaz | A01G 25/16 |
| 2018/0230681 A1* | 8/2018 | Poojary | G01F 15/063 |

* cited by examiner

METHOD AND APPARATUS FOR LEAK DETECTION IN AN IRRIGATION SYSTEM

CROSS REFERENCE

This application claims the benefit of and is a non-provisional conversion of U.S. provisional application No. 62/515,599, titled "Method and Apparatus for Leak Detection in an Irrigation System," filed Jun. 6, 2017, the entirety of which is hereby incorporated by reference.

FIELD OF THE DISCLOSURE

The present disclosure relates generally to irrigation systems, and more particularly to detecting leaks in various zones of an irrigation system based on pressure differences.

BACKGROUND

Irrigation systems are used to irrigate crops and landscaping in order to ensure optimum or near-optimum watering occurs, to supplement natural rainfall. However, water is a resource that often comes at a cost, and therefore it is important to not waste it by over-watering, or by poor maintenance of the irrigation system piping. Leakage can occur due to broken pipes and/or sprinkling heads. In addition to being wasteful, leakage can lower water pressure such that the unbroken components are unable to provide the intended amount of water in their respective area of irrigation/sprinkling. Accordingly, leakage is something that operators of the irrigation system seek to avoid.

Traditionally leakage is detected by inspection, and sometimes by reports when personnel accidently break a component in the system when performing other operations in the area (e.g. mowing). Inspections, however, being performed at intervals, can allow leakage to occur over a period of time, resulting in water being wasted, and areas not being sufficiently watered in the interim time before the leak is detected.

Accordingly, there is a need for a method and apparatus for detecting leaks in irrigation systems.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
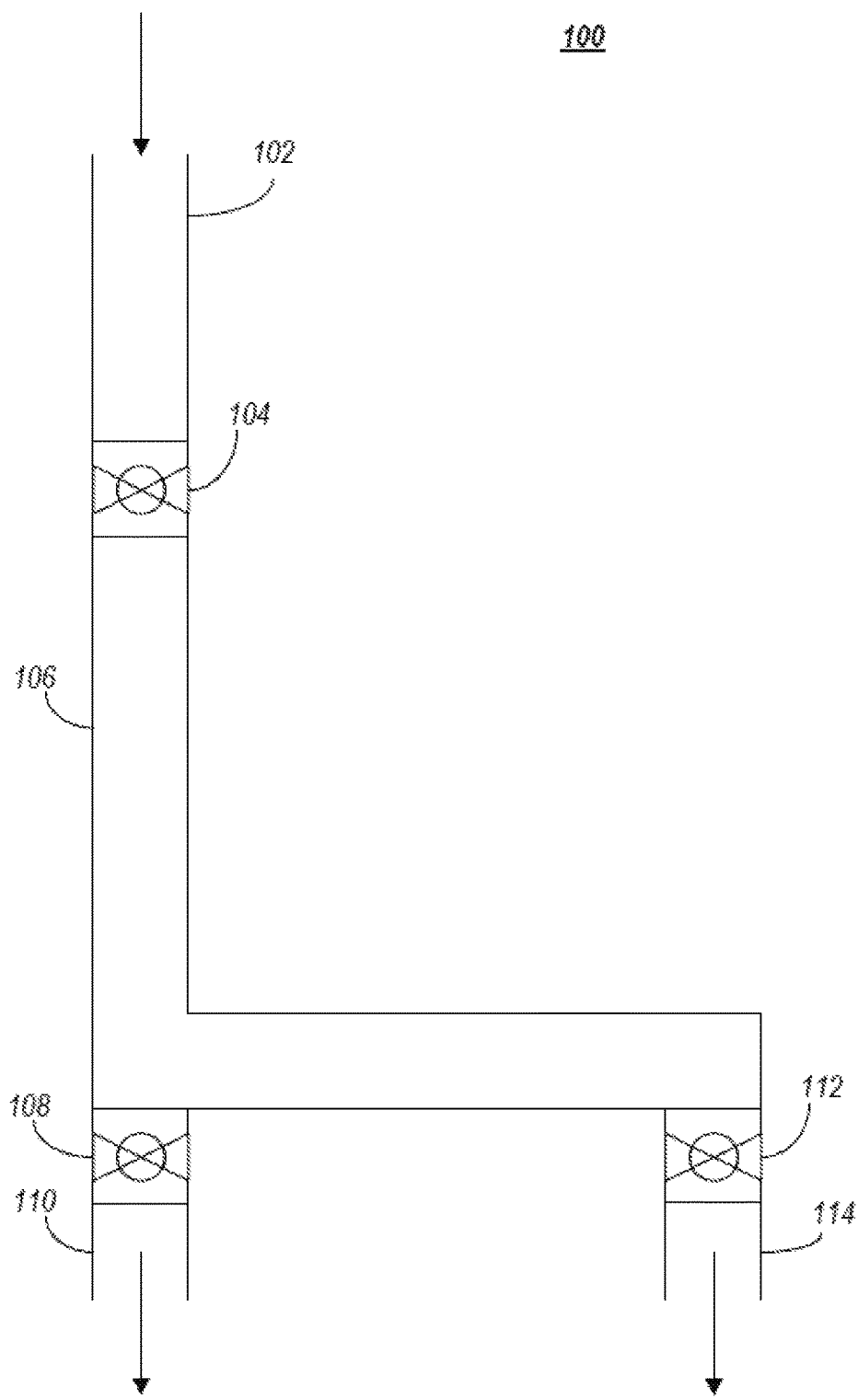
FIG. 1 is a piping diagram of a prior art irrigation system.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure include a method, and a system that carried out the method, for detecting leakage in a zone of a sprinkler system. The method includes a calibrating process to obtain pressure values for each one or more zones of the irrigation/sprinkling system. The calibrating includes, for each of a plurality of zones, sensing pressure at a pressure sensor located between a main valve and a plurality of zone valves with the zone valves closed the main valve opened to obtain a static pressure value. The calibrating can further include, for each zone, recording a pressure value at the pressure sensor with the main valve closed, a bypass valve that routes water around the main valve partially closed, and each respective zone valve opened individually when its respective pressure value is recorded. Leaks are detected using the calibrated pressure reading by, upon occurrence of a time to water, prior to opening the main valve to water in each zone, opening each zone valve independently with the bypass valve in the partially closed state, and comparing a present pressure value with the recorded pressure for each zone. It can be determined that a leak is occurring in a zone when the present pressure value is sufficiently below the recorded pressure value for the zone.

FIG. 1 is a piping diagram of a prior art irrigation system 100. In the prior art system 100, water from a water source enters the irrigation system through in intake pipe 102. The water source can be a commercial water source, such as a municipal water source in some embodiments. A main valve 104 operates to allow or prevent water from entering the irrigation system feed pipe 106. The feed pipe 106 connects to one or more zones through zone valves, such as zone valves 108, 112. Zone valve 108 controls water flow to a first zone through distribution pipe 110, and zone valve 112 controls water flow to a second zone through distribution pipe 114. Distribution pipes 110, 114 are further connected to nozzle components, such as sprinkler heads, that disperse and distribute water under pressure over the area of the zone. Since the terminal irrigation components like sprinkler heads rely on having a minimum pressure to cover an intended area, a leak causes two problems in that it floods one area while depriving water from other areas.

Figure 2:
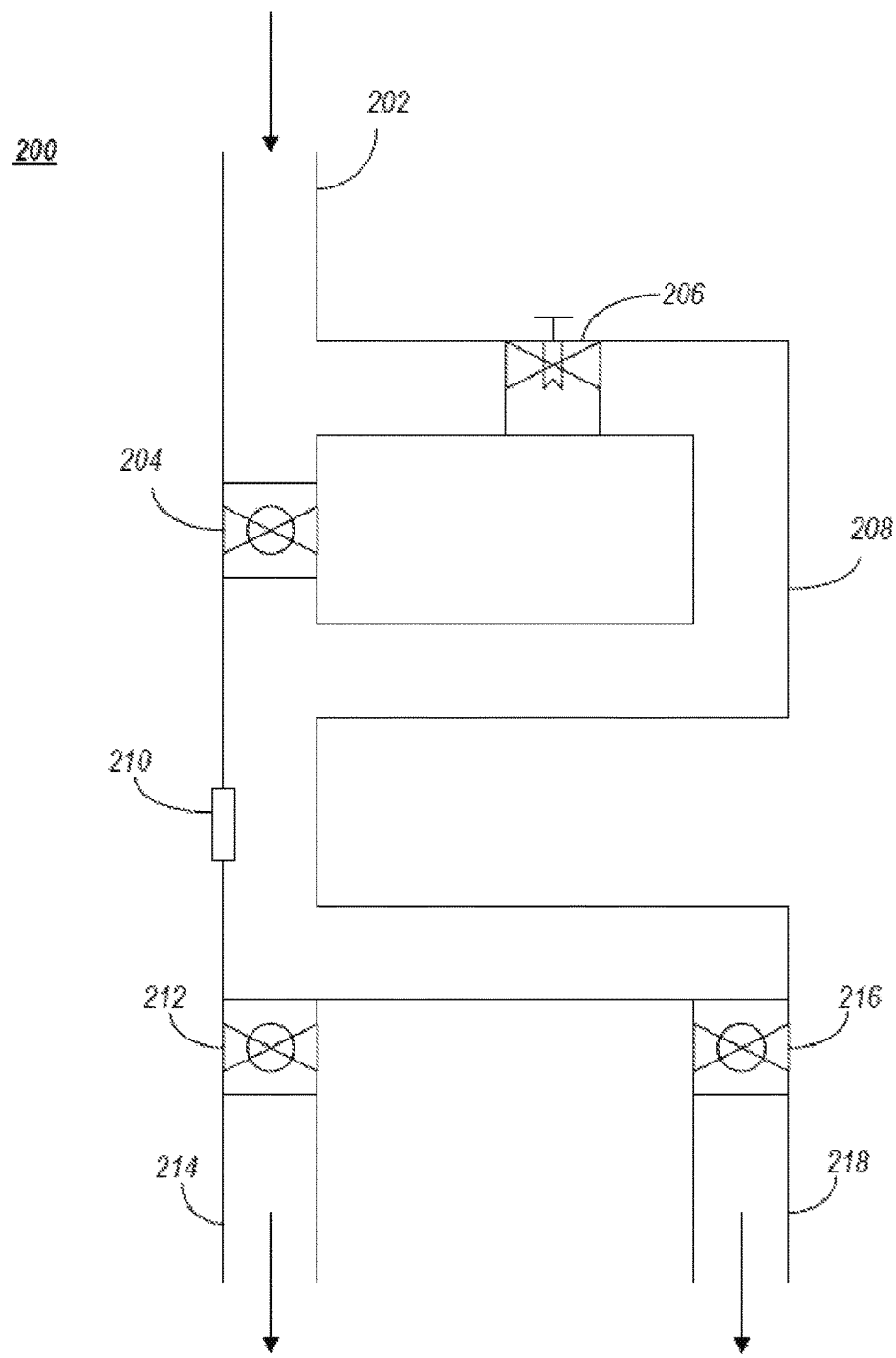
FIG. 2 is a piping diagram of an irrigation system that can detect leaks in various zones of the irrigation system, in accordance with some embodiments.

FIG. 2 is a piping diagram of an irrigation system 200 that can detect leaks in various zones of the irrigation system, in accordance with some embodiments. Water from a water source enters at an intake pipe 202. Water flow can be controlled through the system by a main valve 204 and an adjustable bypass valve 206 which routes water around the main valve 204. The main valve 204 can be an electrically controlled valve that is operated to be either open (allowing maximum water flow) or closed (allowing no water flow). The adjustable bypass valve 206 controls water flow through a bypass pipe 208 around the main valve 204, and is adjustable to control water flow in a graduated manner. That is, adjustable bypass valve 206 can be adjusted to a any state from fully open to fully closed, to achieve a desired flow rate or pressure in the feed pipe, rather than being only on or off. Furthermore, in some embodiments, adjustable bypass valve 206 can be a manually operated valve. Accordingly, with adjustable bypass valve 206 fully closed, water flow is controlled by the main valve 204. The adjustable bypass valve 206 can be electrically controlled such that it can be turned from a closed to state to a selected or pre-set partially open/closed state.

A pressure sensor 210 senses pressure in the pipe after the main valve 204 and bypass valve 206. When both the main valve 204 and adjustable bypass valve 206 are closed, there will be no pressure or very little pressure, at pressure sensor 210. Zone valves 212, 216 control water flow into their respective zones through zone feed pipes 214, 218. Zone valves 212, 216 can be electrically operated, on/off type valves like main valve 204. In general, zone valves 212, 216 are operated such that only one is open at any given time.

When main valve 204 is open, and none of the zone valves 212, 216 (or any others that may be present for other zones) are open, a static pressure can be sensed by pressure sensor 210. The static pressure will be determined by the water source. When either zone valve 212 or 216 is opened, the pressure sensed by pressure sensor 210 will drop as water flows into the respective zone and out of the nozzles of the sprinkling or other water distribution components. The resulting dynamic pressure will be determined by the amount of flow. Thus, a broken nozzle, sprinkler head, or pipe can cause a substantial drop in water pressure due to the relatively unrestricted flow of water.

Figure 3:
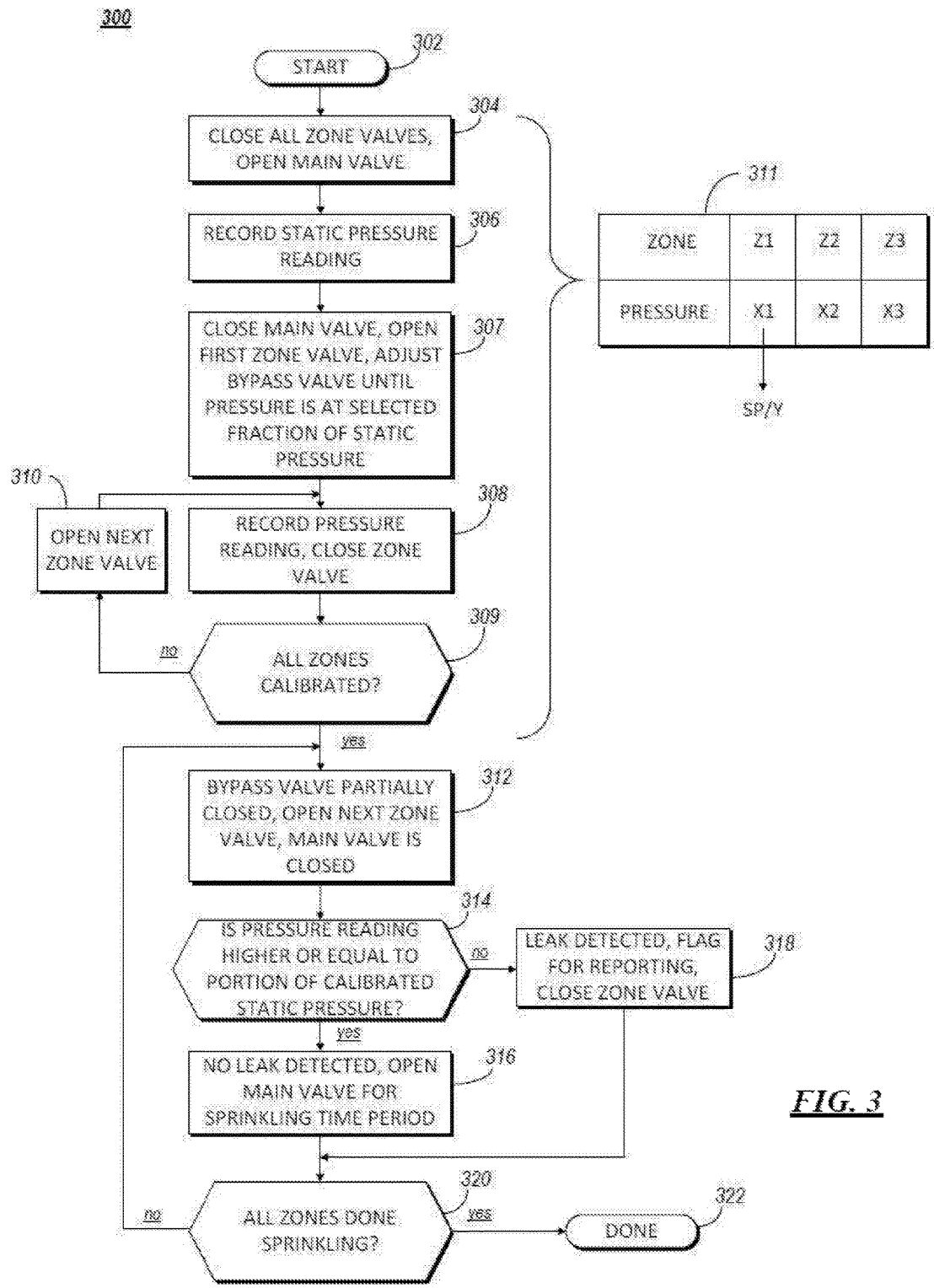
FIG. 3 is a flow chart diagram of a method of calibrating and operating an irrigation system to detect leaks, in accordance with some embodiments.

FIG. 3 is a flow chart diagram of a method 300 of calibrating and operating an irrigation system to detect leaks. The method 300 can be employed using system 200 of FIG. 2. At the start 302, the irrigation system is deployed and ready for operation and is leak free, and water from a water source is available under pressure. In step 304 all zone valves are closed and the main valve (e.g. 204) is opened, and in step 306 the initial static water pressure is measured via the pressure sensor (e.g. 210). The value of the static pressure (SP) is stored. To establish a pressure threshold for leak detection, in step 307 the main valve is closed, the first zone valve is opened, and the bypass valve is adjusted until the pressure sensed at the pressure sensor is at a selected fraction of the SP, or SP/Y, where Y can be, in some embodiments, 2 (two). In step 308 the pressure is recorded and associated with the respective zone. In step 309 the method 300 determines if all zones have been calibrated with the adjustable bypass valve set as it was in step 307. If more zones are to be calibrated, then the method 300 returns via step 310 where the next zone valve is opened, and steps 308, 309 are repeated, and a pressure value is recorded for each zone of the system. As a result, when all zones have been calibrated, a data structure 311 is produced that associates a pressure reading with each zone that is normalized as a fraction of the static pressure when the first zone valve is open and there are no leaks in the plumbing of the first zone. In some embodiments the "first" zone used in step 307 may be selected by certain criteria, including an initial operating pressure where the zone valve and main valve are open at the same time for a given zone. In some embodiments, the zone having the lowest operating pressure can be used in step 307.

Once the calibration is done, then in step 312 irrigation can commence by opening the first zone valve while the main valve is still closed, and the bypass valve is set to being partially closed as it was adjusted in step 307. In other words, once the bypass valve is adjusted in step 307, it is left in that adjusted state. With the main valve closed, and the bypass valve set to its adjusted partially closed state, in step 314 the pressure is determined at the pressure sensor and compared to the respective value in the data structure 311 for the zone being tested. If the pressure reading is lower than the pressure value in data structure 311 for the zone being tested, then it is assumed that a leak is occurring in the zone being tested as there would be insufficient restriction to produce the pressure produced in step 307, and the method 300 proceeds to step 318 where the system sets a flag indicating a leak has been detected, and the zone valve is then closed. The detection of the leak can be reported if the irrigation system is networked. If in step 314 the pressure is sufficiently equal the pressure value stored in data structure 311 then the method 300 proceeds to step 316 as no leak is detected, and watering occurs as expected by opening the main valve for a period of time. Some tolerance in the pressure reading can be applied in step 314 where the current pressure does not have to be identical to that stored in data structure 311, but is within a sufficient measure that ensures a substantial leak is not occurring. After step 316 or step 318, the method 300 determines in step 320 whether all the zones have been tested/watered. If not then the method 300 returns to step 312 for the next zone, otherwise the method finishes 322. In some embodiments the pressure value read in step 314 can be classified further where if the pressure is below the pressure value in the data structure 311, but within a selected percentage, a warning flag can be set so that maintenance personnel can check for leaks, and watering can still occur, but if the pressure is lower than beyond that percentage it is declared a leak and no watering occurs. By giving a warning for slightly low pressure, the system accounts for changes in water pressure from the water source, as it is known that many water sources, particularly municipal water sources, experience variation in water pressure.

In method 300 steps 302-310 are performed for calibration under known no-leak conditions in the zones. Once the known no-leak pressures are generated for data structure 311, the calibration steps 302-310 are generally not repeated unless there is maintenance performed in any of the zones. Steps 312-322 are performed when a watering is occurring. Hence, when it is time to commence watering, steps 302-310 are not performed, and only steps 312-322 are performed to detect leaks while commencing watering. The leak detection aspects of steps 312-322 can be performed every time a watering event occurs, or at other watering intervals (e.g. every second watering event, or every third watering event, etc.). However, considering the pressure of the water source, which is the static pressure SP, can vary from day to day, as is common in municipal water supplies, prior to commencing step 312 a pressure check can be performed to scale the values in data structure 311 for leak detection. Accordingly, prior to opening an zone valves upon commencement of a watering event, the present SP can be determined, and compared to the initial or recorded SP measured in step 306 to produce a scaling ratio SR:

$$\frac{\text{recorded } SP}{\text{current } SP}$$

This scaling ratio can then be applied to the partial pressure references for each zone (e.g. X1-X3 in 311) for use in step 314. Thus in step 314 the method 300 will use, for example, in detecting a leak in zone 1, X1 scaled by the scaling ratio SR by multiplying X1 by SR., and the scaled pressure value is then used in step 314, and repeated for each zone in iterations of steps 312-320.

Figure 4:
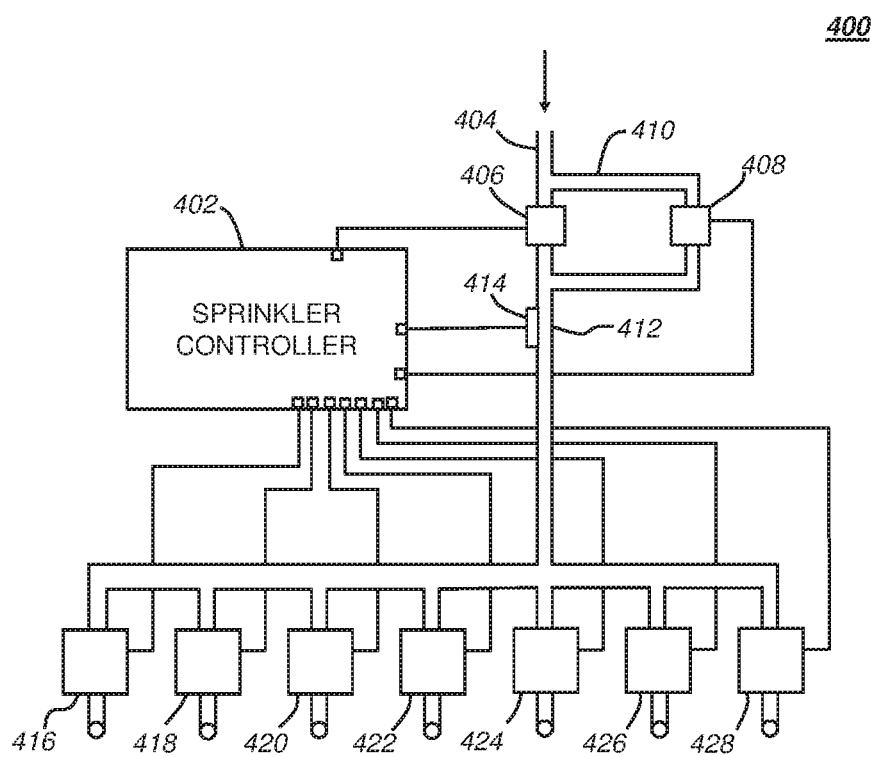
FIG. 4 is a piping diagram of an irrigation system capable of detecting leaks in various zones of the irrigation system and including a sprinkler controller, in accordance with some embodiments.

FIG. 4 is a piping diagram of an irrigation system 400 capable of detecting leaks in various zones of the irrigation system and including a sprinkler controller, in accordance with some embodiments. A sprinkler controller 402 is a programmable device or system that controls irrigation as well as performing leak detection, and is able to communicate with remote stations in the event of detecting a leak. Thus, the sprinkler controller 402 can include an information transceiver, including a wireless radio transceiver in some embodiments, as well as switching circuitry such as relays to control electric power to the various valves. The sprinkler controller 402 also includes one or more inputs, including a pressure sensor input, to receive a signal from a pressure sensor indicated a pressure value. Thus, in this diagram, there is a mix of plumbing and electrical/electronic and electromechanical elements.

Water enters the system from a water source at a source pipe 404. The water source can be a municipal water source having a water pressure that can vary from day to day. A main valve 406 is controlled by the sprinkler controller 402 to allow water at full source pressure into a feed pipe 412 that distributes water to the various zones. A bypass pipe or line 410 includes an adjustable valve 408 that be manually operated or electrically controlled by the sprinkler controller 402. The adjustable valve 408 is adjustable to restrict the flow of water through it, and can be adjusted to any state from fully open to fully closed, or any partially open/closed state. A pressure sensor 414 senses the water pressure in the feed line 412 and provides a pressure signal to the sprinkler controller indicating a pressure value corresponding to the pressure in the feed line 412. The feed line 412 is fluidly coupled to a plurality of zone valves 416-428. Each of the zone valves 416-428 are controlled and operated by the sprinkler controller 402, and are opened by the sprinkler controller to perform tests and to sprinkle/irrigate at scheduled times. The pressure sensor 414 can be located in the feed line 412 anywhere between the main valve 406 and the zone valves 416-428.

The sprinkler controller 402 periodically, such as prior to a scheduled watering time, performs leak checks to determine if there is a leak in any of the zones (i.e. piping that is downstream of the zone valves 416-428). The system 400 is first calibrated by measuring or reading the current or initial static pressure at the pressure sensor 414, with all of the zone valves 416-428 closed. Then, individually (e.g. one by one), each zone valve 416-428 is opened and a corresponding initial operating pressure value is recorded by the sprinkler controller. From among this set of initial operating pressures, one of the zones/zone valves is selected based on its initial operating pressure. The criteria can be to select the zone having an initial operating pressure that is closest to the average (the mean or the median) initial operating pressure among the zones. In some embodiments, the zone having the lowest initial operating pressure can be selected, or the zone having the highest initial operating pressure can be selected. In some embodiments, any outliers among the initial operating pressure values can be excluded from consideration.

As an example, assume that an initial static pressure is measured at 80 pounds per square inch (psi), and the initial operating pressures of zones 416-428 are, respectively, in psi:

52, 53, 55, 54, 53, 45, 54

In this set of initial operating pressures, the 45 psi value can be detected as an outlier as being more than a threshold value from the average initial operating pressure. It will be appreciated that, while the examples use integers, the actual pressure values can recorded in tenths or hundredths of a psi. Thus, the 45 psi value is excluded, and from the remaining initial operating pressure, 52 psi, corresponding to zone valve 416, is the lowest, and is selected for further operation. Selecting the zone having the lowest operating pressure can optimize pressure comparisons performed in subsequent leak detection operation. For each zone, a test factor can be recorded as the ratio of its initial operating pressure to that of the selected zone. Thus, for zone 420, with an initial operating pressure of 55 psi, the recorded test factor for the zone corresponding to zone valve 420 will be 55/52, or 1.058.

Once one of the zones is selected, with the main valve closed, the zone valve for the selected zone is opened, and the adjustable valve 408 is adjusted until the pressure in the feed line is at a selected proportion of the initial static pressure. In some embodiments that selected proportion can be half, or 50%. Thus, continuing the example using the above figure, zone valve 416 is opened and the adjustable valve 408 is adjusted (manually or under electronic control of the sprinkler controller 402) until the pressure in the feed line is at 40 psi (e.g. half of 80 psi), using a preselected proportion of 50%.

Later, when it is time to perform a leak check, the sprinkler controller 402 ensures all zone valves 416-428 are closed, and opens the main valve 406 and determines the current static pressure. Then, with the main valve 406 closed, and the adjustable valve 408 unchanged from the calibration setting, the sprinkler controller 402 individually opens each zone valve to acquire a current test pressure. If the adjustable valve 408 was set so that the first zone valve 416, when opened, would result in a pressure of half that of the static pressure, then if the first zone has no leaks the current test pressure for the first zone should be no lower than half the current static pressure. Likewise, the test pressure for each other zone 418-428 should not be less than half the current static pressure scaled by the test factor for the respective zone, as recorded by the sprinkler controller 402 in the calibration phase. Any zone that has a test pressure that is lower than the selected proportion of the static pressure (e.g. half) as scaled by the test factor for the zone, by more than a threshold value is likely experiencing a leak. The threshold value can be, for example, 2 psi. Upon determining that a leak is occurring, the sprinkler controller 402 can transmit an alert message to a remote station, such as a monitoring site or an administration server, where a supervisor will see the alert so that the leak can be checked and repaired if necessary.

Figure 5:
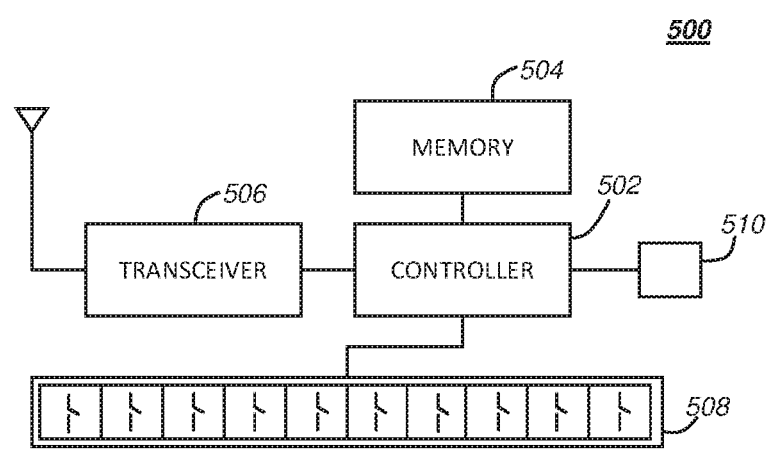
FIG. 5 is a block schematic diagram of a sprinkler controller configured to detect leaks in sprinkler zones, in accordance with some embodiments.

FIG. 5 is a block schematic diagram of a sprinkler controller 500 configured to detect leaks in sprinkler zones, in accordance with some embodiments. The sprinkler controller 500 can be substantially the same as 402 of FIG. 4, and includes a controller 502 which is a microprocessor or similar instruction-driven logic processor. The controller 502 is coupled to a memory 504, which here represents an aggregate of memory components that can include read only memory (ROM), random access memory (RAM), flash memory, and other memory components. The memory 504 can contain instruction code that is executed by the controller 502 to schedule watering, timing, perform leak detection, and other functions described herein and routinely performed by irrigation controllers. The controller 502 can be further coupled to a transceiver 506 which can transmit and receive signal using radio communication. In some embodiments the transceiver 506 can be a cellular modem that can connect to the data service of a cellular telephony infrastructure. In some embodiments a second wireless radio transceiver can be present in the sprinkler controller 500 for short range wireless communication (e.g. WiFi, Personal Area Networking). The controller 502 can control the state of a plurality of switch elements 508, which can be transistor or relay-based (e.g. electromechanical). The switch elements each control electricity to a controlled component of the sprinkler system, such as the main valve, zone valves, and adjustable valve. A pressure sensor input 510 allows the controller 502 to receive information from a pressure sensor, or a pressure sensor processor. In some embodiments the input 510 can be a simple analog electrical signal having a voltage or other electrical parameter that varies with pressure, and the controller 502 includes an analog to digital converter for converting the analog signal to a digital value. In some embodiments a separate circuit in the sprinkler controller can process the pressure signal and convert it into digital values under control of the controller 502. The sprinkler controller 500 is configured to perform leak detection as disclosed herein by operation of the various components shown in FIG. 5.

Figure 6:
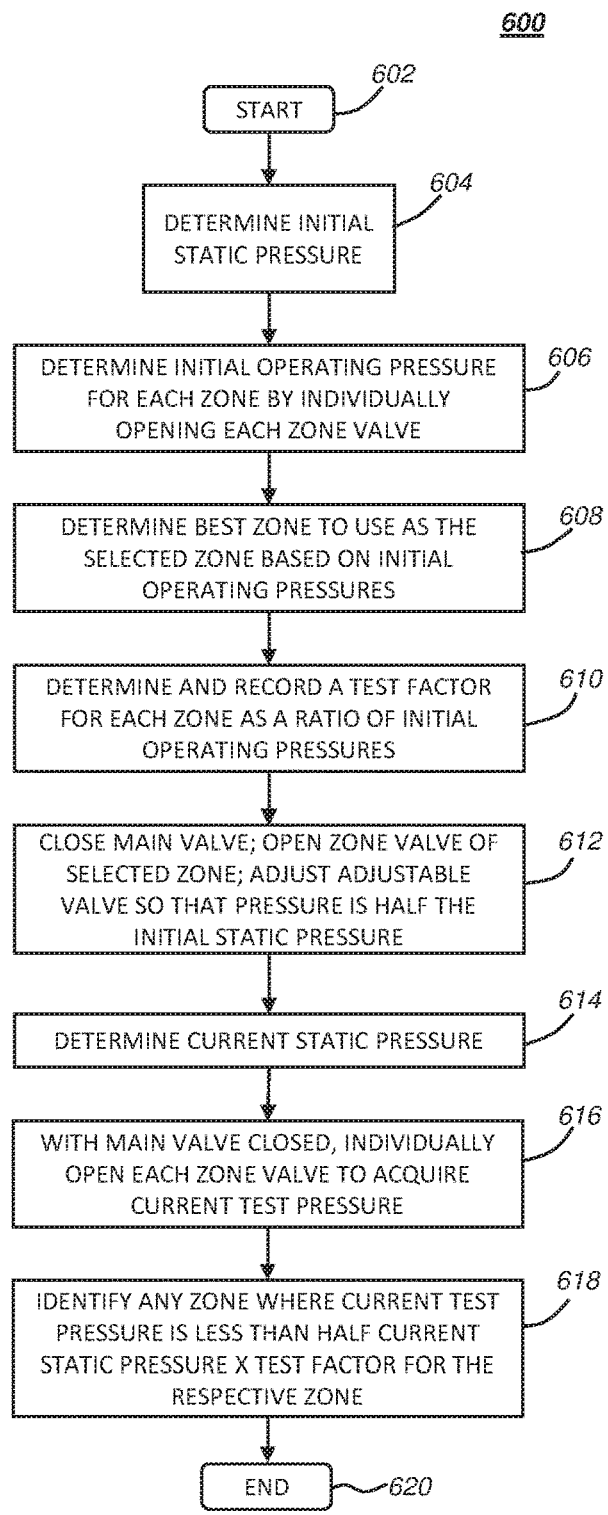
FIG. 6 is a flow chart diagram of a method for detecting leaks in different zones of a sprinkler system, in accordance with some embodiments.

FIG. 6 is a flow chart diagram of a method 600 for detecting leaks in different zones of a sprinkler system, in accordance with some embodiments. The method 600 can be performed substantially by the sprinkler controller 402 of FIG. 4 or 500 of FIG. 5 in the context of controlling an irrigation or sprinkling system. At the start 602 the sprinkler system is installed, powered, and water is provided from water source at a water pressure that can vary over time. The method can include a calibration or set up portion and a test portion, and is similar to the method of FIG. 3. The calibration portion includes steps 604 612, and the test portion includes steps 614-618.

In step 604 the initial static pressure is determined. The static pressure is the pressure provided by the water source, with no water flowing through the pipes (e.g. all the zone valves are closed). After determining the initial static pressure, then each zone valve is individually opened to obtain an initial operating pressure for each zone in step 606. In step 608 one of the zones is selected based on the measured initial operating pressures for each zone. There are various criteria that can be used to select a zone, including selecting the zone having the highest or lowest operating pressure, or the zone having the initial operating pressure that is closest to the mean or median initial operating pressure. However, it has been found that selecting the zone having the lowest initial operating pressure is beneficial and provides the best linearity in subsequent operations. In step 610 the test factor for each zone is determined as a ratio of its respective initial operating pressure to the initial operating pressure of the selected zone. Thus, for the selected zone (or selected zone valve) the test factor will be 1. If the selection criteria is to select the zone with the lowest initial operating pressure, then the test factor for each of the other zones will be greater than 1. In some embodiments, the selection process can include an outlier exclusion where zones having initial pressures that are too far outside the main group of pressure values are not considered. When an irrigation system is designed, each zone typically is given the same number of outlets (e.g. sprinkler heads), and as a result they tend to have similar operating pressures to ensure there is sufficient pressure to cause the water to leave the sprinkler head at a sufficient velocity to cover the area intended to be watered by each sprinkler head. Thus, outliers are zones that have too many or too few sprinkler head, or some other issue such already having a significant leak. The outliers can be determined (i.e. identified outliers), in some embodiments, as being outside a standard deviation of the initial operating pressure values, or by being more than five percent different from a mean initial operating pressure, for example. Typically the operating pressure of a given zone will be around 60%-80% of the static pressure.

In step 612, the main valve is closed and the zone valve of the selected zone (as selected in step 610) is opened, and the adjustable valve is opened until the pressure is half the initial static pressure. During this brief time, as with determining the initial operating pressure, water will be flowing through the various zones briefly. The point of setting the adjustable valve is to establish a proportional relationship between static pressure and the pressure resulting when the main valve is closed and one of the zone valves is open. Step 612 concludes the calibration or set up portion.

In step 614, which can occur some time after step 612, the sprinkler controller proceeds to perform a leak check. This can be performed, for example, at intervals, or prior to a scheduled watering time. In some embodiments the scheduled watering time can occur every several days (e.g. 2 to 7 days), and the leak detection can be performed every day. To commence the leak check, the current static pressure is determined since pressure can vary in water sources. Once the current static pressure is known, then in step 616 each zone valve is individually opened while the main valve is closed. Since the adjustable valve is partially open/closed, water will still flow through the feed pipe to zones. A resulting test pressure will be produced by each zone upon opening the respective zone valve, producing a respective current test pressure for each respective zone. In step 618 the test pressure produced by each zone is then compared to the proportion of the current static pressure to which the adjustable valve was set in step 612. For example, if in step 612 the adjustable valve was set so that the selected zone produced a pressure of half the static pressure, then when the selected zone is opened in step 618 the resulting pressure should be half the current static pressure, which may be different than the initial static pressure measured in step 604. The test pressure is compared to a value that is the product of the current test pressure, the preselected proportion used in step 612, and the test factor for the particular zone determined in step 610. Thus, if the selected zone is selected in step 608 as the zone having the lowest initial operating pressure, and the selected proportion used in step 612 is half or 50%, then in step 618 when the zone valve for the selected zone is opened the resulting pressure in the feed line should be about half the current static pressure. The other zones will produce test pressures that are slightly higher. In generally, for each zone, current test pressure is compared to the multiplicative product of: the ratio of the zone's initial operating pressure to the initial operating pressure of the selected zone, and half the current static pressure. As used here, the term "multiplicative product" mean multiplying the values. Any zone that has a test pressure that is substantially lower than expected will be flagged as having a leak by the sprinkler controller. When the sprinkler controller determines a leak is occurring in one or more of the zones, it can transmit an alert message to a remote station to people who monitor the sprinkler controller, who can then travel to the location of the sprinkler system and confirm and repair any detected leaks. Furthermore, until a detected leak is fixed the sprinkler controller can avoid sprinkling in the zone or zones with a leak at schedule sprinkling times.

Accordingly, the embodiments of the disclosure provide the benefit of detecting leaks in irrigation zones. The leak detection is based on a comparison of the current state of the irrigation system upon watering with that of a known calibrated state as measured when it was known that there were no leaks in the irrigation system. To account for day to day variations in the pressure of the water source, and scaling ratio can be determined each time watering is commenced so that recorded pressure values can be scaled accordingly in comparing current pressure values with those recorded under the known no-leak conditions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A method for detecting a leak in a zone of a sprinkler system having a main valve, an adjustable valve in a bypass line around the main valve, and a zone valve, the adjustable valve being set to a partially closed state at an initial setting such that a pressure in a feed line to the zone valve when the main valve is closed and the zone valve is open is at substantially half an initial static pressure, the method comprising:

determining a current static pressure;
with the main valve closed, opening the zone valve and determining a current test pressure; and
determining that there is a leak in the zone when the current test pressure is less than half the current static pressure.

2. The method of claim 1, wherein the zone valve is a selected zone valve of a plurality of zone valves of the sprinkler system, each of the plurality of zone valves being fluidly coupled to the feed line, the method further comprising:
determining an initial operating pressure for each of the plurality of zone valves by individually opening each one of the plurality of zone valves with the main valve open;
measuring a pressure in the feed line to determine an initial operating pressure; and
selecting the selected zone valve as a zone valve having the lowest initial operating pressure of plurality of zone valves.

3. The method of claim 2, wherein selecting the selected zone valve further comprises:
determining a mean or median initial operating pressure from the initial operating pressures of each of the plurality of zone valves;
identifying any outliers among the plurality of zone valves having an initial operating pressure that differs from the mean or median initial operating pressure by more than a threshold value; and
wherein selecting the selected zone is performed without including any of the identified outliers.

4. The method of claim 2, further comprising:
with the main valve closed, and the selected zone valve open, adjusting the adjustable valve to the partially closed state where a pressure in the feed line is equal to substantially half of the initial static pressure.

5. The method of claim 2, for each of the plurality of zones valves other than the selected zone valve, the method further comprising:
determining and recording a proportion of the initial operating pressure relative to the initial operating pressure operating pressure of the selected zone valve;
with the main valve closed, independently opening each one of the plurality of zone valves and determining a respective current test pressure; and
determining that there is a leak in one or more of the plurality of zones when the respective current test pressure for a zone valve is less than a multiplicative product of the proportion for the zone and half the current static pressure.

6. The method of claim 1, further comprising, in response to determining that there is the leak in the zone, upon occurrence of a time to sprinkle, not enabling sprinkling in the zone.

7. The method of claim 1, further comprising, in response to determining that there is the leak in the zone, transmitting an alert message from a sprinkler controller performing the method to a remote station.

8. A method for detecting a leak in a zone of a multi-zone sprinkler system having a main valve, an adjustable valve in a bypass line around the main valve, and a plurality of zone valves, the adjustable valve being set to a partially closed state such that a pressure in a feed line to the plurality of zone valves when the main valve is closed and a selected zone valve of the plurality of zone valves is open is at substantially half an initial static pressure, the method comprising:
determining a current static pressure;
with the main valve closed, opening each zone valve independently and determining a respective current test pressure for each zone;
determining that there is a leak in the selected zone when the current test pressure when the selected zone valve is opened is less than half the current static pressure; and
determining that there is a leak in one or more of the plurality of zones other than the a zone for the selected zone valve when the respective current test pressure for one of the plurality of zones is less than a respective proportion of half the current static pressure, wherein the respective proportion for each of the plurality of zones is a ratio of an initial operating pressure for each zone to an initial operating pressure of the selected zone valve.

9. The method of claim 8, further comprising selecting the selected zone valve as having the lowest initial operating pressure of plurality of zone valves.

10. The method of claim 9, wherein selecting the selected zone valve further comprises:
determining a mean or median initial operating pressure from the initial operating pressures of each of the plurality of zone valves;
identifying any outliers among the plurality of zone valves having an initial operating pressure that differs from the mean or median initial operating pressure by more than a threshold value; and
wherein selecting the selected zone is performed without including any of the identified outliers.

11. The method of claim 9, further comprising:
with the main valve closed, and the selected zone valve open, adjusting the adjustable valve to the partially closed state where a pressure in the feed line is equal to substantially half of the initial static pressure.

12. The method of claim 8, further comprising, upon occurrence of a time to sprinkle for the sprinkler system, inhibiting sprinkling in any zone in which a leak has been detected.

13. The method of claim 8, further comprising, in response to determining that there is the leak in any zone, transmitting an alert message from a sprinkler controller of the sprinkler system performing the method to a remote station.

14. A method for operating a multi-zone sprinkler system including a main valve coupled between a water source line and a feed line, an adjustable valve disposed in a bypass line around the main valve from the water source line to the feed line, a plurality of zone valves each coupled to the feed line, and a pressure sensor disposed in the feed line indicating a pressure in the feed line, the method comprising:
determining an initial static pressure with the main valve open and all zone valves closed;
with the main valve open, independently opening each zone valve to determine a respective initial operating pressure for each zone;
selecting a zone as a selected zone based on the respective initial operating pressures, and recording a test factor for each zone as a proportion of the respective initial operating pressure for each zone to the initial operating pressure of the selected zone;
with the main valve closed and the zone valve for the selected zone open, adjusting the adjustable valve to a partially closed state until the pressure in the feed line is at a selected proportion of the initial static pressure;
performing leak detection for each zone by:

determining a current static pressure;

with the main valve closed and the adjustable valve in the partially closed state, independently opening each zone valve to determine a respective test pressure; and determining a leak in a given zone when the respective test pressure for the given zone is lower than a multiplicative product of the current static pressure, selected proportion of the initial static pressure, and the test fact for the given zone.

15. The method of claim 14, wherein, in adjusting the adjustable valve, the selected proportion is half the initial static pressure.

16. The method of claim 14, wherein selecting the zone as the selected zone comprises selecting the zone having the lowest initial operating pressure.

17. The method of claim 16, wherein selecting the zone having the lowest initial operating pressure comprises selecting the zone having the lowest initial operating pressure from a group of zone of the plurality of zones that excludes any zones having an initial operating pressure that deviates from a mean or median initial operating pressure of the initial operating pressures of the plurality of zones by a preselected threshold.

18. A sprinkler controller for a multi-zone sprinkler system, comprising:

a controller;

a plurality of switches, each independently operated by the controller and configured to control operation of a respective one of a plurality of valves including a plurality of zone valves and a main valve; and a pressure sensor input coupled to the controller and configured to receive a signal from a pressure sensor disposed in a feed line of the multi-zone sprinkler system;

wherein the controller is configured to:

determine, for each zone, a test factor as a proportion of an initial operating pressure for each zone relative to the initial operating pressure for a selected zone;

wherein, an adjustable valve in a line around the main valve is adjusted to a partially closed state such that, with the main valve closed and the valve for the selected zone open, results in a pressure of half an initial static pressure; and determine a current static pressure and determine whether each zone is leaking by, with the main valve closed, opening each zone valve to obtain a respective test pressure, and determine whether the test pressure is lower than half the current static pressure as adjusted by the test factor for the respective zone.

19. The sprinkler controller of claim 18, wherein the selected zone is selected at the zone having the lowest initial operating pressure.

20. A method for detecting leakage in a zone of a sprinkler system, comprising:

calibrating each of a plurality of zones by:

sensing pressure at a pressure sensor located between a main valve and a plurality of zone valves with the zone valves closed the main valve opened to obtain an initial static pressure;

for each zone, recording a pressure value at the pressure sensor with the main valve closed, a bypass valve that routes water around the main valve in a partially closed state, and each respective zone valve opened individually when its respective pressure value is recorded;

upon occurrence of a time to water, prior to opening the main valve to water in each zone, opening each zone valve independently with the bypass valve in the partially closed state, and comparing a present pressure value for each zone with the recorded pressures for each zone; and determining that a leak is occurring in a zone when the present pressure value is sufficiently below the recorded pressure value for the zone.

21. The method of claim 20, wherein, in recording the pressure value for each zone, the bypass valve is partially closed such that the pressure value is half that of the static pressure of the lowest pressure zone.

22. The method of claim 20, wherein, upon determining that a leak is occurring at one of the plurality of zones, setting a flag for the one of the plurality of zones for reporting.

23. The method of claim 20, further comprising:

determining a current static pressure upon the occurrence of the time to water;

determining a scaling ratio as a ratio of the initial static pressure to the current static pressure; and applying the scaling ratio to the recorded pressures for each zone when comparing the present pressure value for each zone with the recorded pressures for each zone.

* * * * *